United States Patent
Srivastava et al.

(10) Patent No.: US 11,934,335 B2
(45) Date of Patent: Mar. 19, 2024

(54) POWER MANAGEMENT FOR PERIPHERAL COMPONENT INTERCONNECT

(71) Applicant: QUALCOMM Incorporated, San Diego, CA (US)

(72) Inventors: Prakhar Srivastava, Lucknow (IN); Ravindranath Doddi, Hyderabad (IN); Santhosh Reddy Akavaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/715,792

(22) Filed: Apr. 7, 2022

(65) Prior Publication Data

US 2023/0325342 A1 Oct. 12, 2023

(51) Int. Cl.
| | |
|---|---|
| *G06F 13/42* | (2006.01) |
| *G06F 1/08* | (2006.01) |
| *G06F 1/3234* | (2019.01) |
| *G06F 13/40* | (2006.01) |

(52) U.S. Cl.
CPC ............ *G06F 13/4221* (2013.01); *G06F 1/08* (2013.01); *G06F 1/3253* (2013.01); *G06F 13/4072* (2013.01)

(58) Field of Classification Search
CPC .... G06F 13/4072; G06F 13/4221; G06F 1/08; G06F 1/3253
See application file for complete search history.

(56) References Cited

U.S. PATENT DOCUMENTS

| | | | | |
|---|---|---|---|---|
| 7,469,311 | B1* | 12/2008 | Tsu ..................... | G06F 13/4018 710/29 |
| 2013/0007489 | A1* | 1/2013 | Unnikrishnan ....... | G06F 1/3278 713/320 |
| 2014/0149775 | A1* | 5/2014 | Ware ................... | G06F 13/1694 713/323 |
| 2017/0201702 | A1* | 7/2017 | Niwa .................... | H04N 25/75 |
| 2019/0041898 | A1* | 2/2019 | Harriman ............ | G06F 13/4221 |
| 2019/0158374 | A1* | 5/2019 | Branover ............ | H04L 41/0813 |
| 2021/0041929 | A1* | 2/2021 | Connor ................. | H04L 12/10 |
| 2022/0094639 | A1* | 3/2022 | Mutschler ........... | G06F 13/4221 |

FOREIGN PATENT DOCUMENTS

WO 2013095422 A1 6/2013

OTHER PUBLICATIONS

International Search Report and Written Opinion—PCT/US2023/014099—ISA/EPO—dated Jun. 16, 2023.

* cited by examiner

*Primary Examiner* — Phong H Dang
(74) *Attorney, Agent, or Firm* — Loza & Loza, LLP/Qualcomm

(57) ABSTRACT

Aspects relate to power management for a peripheral component interconnect. Transmit traffic activity may be monitored for a peripheral component interconnect express (PCIe) link. Receive traffic activity may also be monitored for the link A first power of transmit lines of the link is managed as a transmit group in accordance with the transmit traffic activity. A second power of the receive lines of the link are managed as a receive group in accordance with the receive traffic activity. The first power of the transmit lines is managed independently of the second power of the receive lines.

20 Claims, 11 Drawing Sheets

| TX Traffic | No. of Line Pairs | RX Traffic | No. of Line Pairs |
|---|---|---|---|
| Threshold 1 | 1 | Threshold 1 | 1 |
| Threshold 2 | 2 | Threshold 2 | 2 |
| • • • | • • • | • • • | • • • |
| Threshold m | 32 | Threshold m | 32 |

700

| TX Traffic | No. of Line Pairs | RX Traffic | No. of Line Pairs |
|---|---|---|---|
| Threshold 1 | 1 | Threshold 1 | 1 |
| Threshold 2 | 2 | Threshold 2 | 2 |
| ⋮ | ⋮ | ⋮ | ⋮ |
| Threshold m | 32 | Threshold m | 32 |

| L1 | L2 | L3 | L4 | B0 / B1 |
|---|---|---|---|---|
| 0 | 0 | 0 | 0 | 0x0 |
| 0 | 0 | 0 | 1 | 0x1 |
| 0 | 0 | 1 | 0 | redundant |
| 0 | 0 | 1 | 1 | 0x3 |
| 0 | 1 | 0 | 0 | redundant |
| 0 | 1 | 0 | 1 | redundant |
| 0 | 1 | 1 | 0 | redundant |
| 0 | 1 | 1 | 1 | 0x7 |
| 1 | 0 | 0 | 0 | redundant |
| 1 | 0 | 0 | 1 | redundant |
| 1 | 0 | 1 | 0 | redundant |
| 1 | 0 | 1 | 1 | redundant |
| 1 | 1 | 0 | 0 | redundant |
| 1 | 1 | 0 | 1 | redundant |
| 1 | 1 | 1 | 0 | redundant |
| 1 | 1 | 1 | 1 | 0x9 |

FIG. 8

POWER MANAGEMENT FOR PERIPHERAL COMPONENT INTERCONNECT

INTRODUCTION

Aspects of the present disclosure relate generally to peripheral component interconnect express (PCIe) devices and, more particularly, to managing link power for PCIe devices. High-speed interfaces are frequently used between circuits and components of mobile wireless devices and other complex systems. For example, certain devices may include processing, communications, storage and/or display devices that interact with one another through one or more high-speed interfaces. Some of these devices, including synchronous dynamic random-access memory (SDRAM), may be capable of providing or consuming data and control information at processor clock rates. Other devices, e.g. display controllers, may use variable amounts of data at relatively low video refresh rates.

The peripheral component interconnect express (PCIe) standard is a popular high-speed interface which supports a high-speed link capable of transmitting data at multiple gigabits per second. The interface also has multiple standby modes for when a link is inactive. PCIe provides lower latency and higher data transfer rates compared to parallel buses. PCIe is specified for communication between a wide range of different devices. Typically, one device, e.g. a processor or hub, acts as a host, that communicates with multiple devices, referred to as endpoints, through PCIe links. The peripheral devices or components may include graphics adapter cards, network interface cards (NICs), storage accelerator devices, mass storage devices, Input/Output interfaces, and other high-performance peripherals.

A connection between any two PCIe devices is referred to as a link. A PCIe link is built around a duplex, serial (1-bit), differential, point-to-point connection referred to as a lane. With PCIe, data is transferred over two signal pairs: two lines (wires, circuit board traces, etc.) for transmitting and two lines for receiving. The transmitting and receiving pairs are separate differential-pairs for a total of four data lines per lane. The link encompasses a set of lanes, and each lane is capable of sending and receiving data packets simultaneously between the host and the endpoint.

A PCIe link, as currently defined, can scale from one to 32 separate lanes. Usual deployments have 1, 2, 4, 8, 12, 16, or 32 lanes, which may be labeled as x1, x2, x4, x8, x12, x16, or x32, respectively, where the number is effectively the number of lanes. In an example, a PCIe x1 implementation has four lines to connect one wire-pair lane in each direction while a PCIe x16 implementation has 16 times that amount for 16 lanes or 64 lines.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example an apparatus having an interface circuit and a controller is disclosed for a peripheral component interconnect express (PCIe) link. The apparatus includes an interface circuit configured to provide an interface with a peripheral component interconnect express (PCIe) link and a controller. The controller is configured to monitor transmit traffic activity for the link, monitor receive traffic activity for the link, manage a first power of transmit lines of the link as a transmit group in accordance with the transmit traffic activity, and manage a second power of receive lines of the link as a receive group in accordance with the receive traffic activity, independently of the power of the transmit lines.

Another example provides a method that includes monitoring transmit traffic activity for a peripheral component interconnect express (PCIe) link, monitoring receive traffic activity for the link, managing a first power of transmit lines of the link as a transmit group in accordance with the transmit traffic activity, and managing a second power of the receive lines of the link as a receive group in accordance with the receive traffic activity, independently of the power of the transmit lines.

Another example provides a non-transitory computer-readable medium having instructions stored therein for causing a processor of an interconnect link to perform operations that include monitoring transmit traffic activity for a peripheral component interconnect express (PCIe) link, monitoring receive traffic activity for the link, managing a first power of transmit lines of the link as a transmit group in accordance with the transmit traffic activity, and managing a second power of the receive lines of the link as a receive group in accordance with the receive traffic activity, independently of the power of the transmit lines.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 7 is an example of a lookup table mapping traffic activity to a number of active lines according to certain aspects of the present disclosure.

FIG. 8 is a table of link activity conditions in an x4 link according to aspects of the present disclosure.

DETAILED DESCRIPTION

Figure 1:
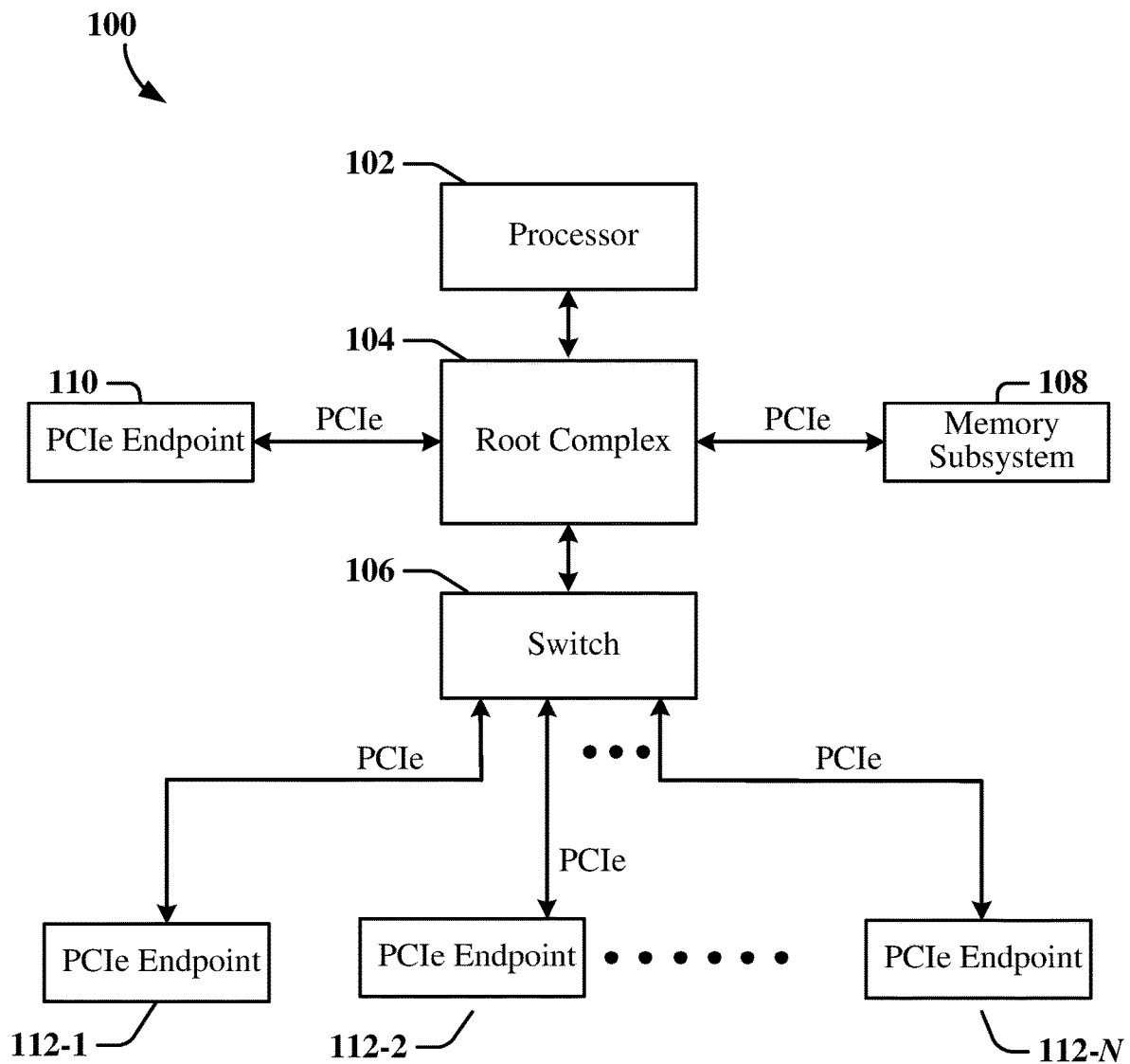
FIG. 1 is a block diagram of a computing architecture with PCIe interfaces suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

An aspect relates to a system for managing power across a wired peripheral component interconnect link, e.g. PCIe. A first power of the transmit lines is managed as a transmit group in accordance with the transmit traffic activity and a second power of the receive lines is managed as a receive group in accordance with the receive traffic activity. The power of the receive lines of the link is managed independently of the power of the transmit lines of the link. The power may be managed by controlling the number of active lines in each direction, among other communication parameters. In some aspects, each line is placed in an active or a standby state. In some aspects, each group is placed in an active or one of multiple standby states, depending on the number of lines that are active.

Aspects of the present disclosure provide bandwidth based PCIe power management for each direction of the link. Independent active line scaling may be used in each direction. Aspects of the present disclosure are discussed below using the examples of an x4 link in PCIe generation 5. However, the present disclosure is not limited to these examples. The present disclosure may be used to provide power management for future implementations of the PCIe standard (e.g., GEN6 and beyond). Furthermore, while the present disclosure is discussed in relation to PCIe links, the underlying principles of the disclosed systems and methods may be implemented in other types of Peripheral Component Interconnect (PCI) links or even in other physical serial interconnects between host and client devices.

Aspects of the present disclosure relate to dynamically changing a power state of a peripheral component interconnect express (PCIe) link to optimally save device power. A PCIe specification allows for an active state (e.g. L0) and one or more standby states (e.g. L1, L2, L3) and substrates (e.g. L1.1, L1.2). In examples, each lane of a link may have a different active state. As an example, an x4 link with 4 lanes may operate with zero, one, two, three or all four lanes active, giving five possible active states but sixteen possible active implementations, depending on which lanes are active. As an example, a state with one active lane may be implemented in four different ways by making any one of the four lanes be the active lane. Each active state also allows for different link speeds, also referred to as a data rate that depends on the stated speed capability of the link. PCIe GEN1 allows for 2.5 giga transfers per second (GT/s), PCIe GEN2 allows for 5 GT/s, and PCIe GEN3 allows for 8 GT/s, PCIe GEN4 allows for 16 GT/s, PCIe GEN5 allows for 32 GT/s, and later generations may offer still higher data rates for each lane of a link.

Power management and bandwidth negotiation, as defined in current standards, is performed at link initialization but may be repeated at later times. During negotiation, each link partner may advertise a supported number of lanes (e.g. link width) and a desired bandwidth at which to operate. For example, the link partners may agree to operate at the highest bandwidth supported by both partners. The link partners are negotiating that some number of lanes of the link be in an active state and may change the number of lanes to a lower rate for link stability reasons. In an example, the link width may be changed autonomously by hardware. As the number of lanes increases, the power to operate the link also increases. As such, an x16 link may be operated as an x1 link at lower power in some circumstances. This reduces the power consumed by the supporting hardware during low-activity periods.

The power management and bandwidth negotiation, as defined in current standards, takes place for the link as a whole. Transmit and receive data is treated the same way. If, for example, the negotiated receive bandwidth is large, then the power allocated for the transmit bandwidth will also be large. However, in some circumstances, the transmit and receive usage or requirements are different. As an example, the traffic flow may be largely unidirectional with no reverse traffic. This may occur, for example, if the link is used for data storage and there is a large write operation into a data store. In another example, the receive bandwidth usage may be large and the transmit usage may be very low. This may occur, for example, if the link is used to download a video file on a wireless network link in which there are only a few acknowledgment packets sent in the transmit direction. There are many other scenarios with asymmetrical bandwidth use. Additional power savings may be realized by handling the power management and bandwidth negotiation in one direction independent of the other direction.

In some examples, the transmit lines of all of the lanes in a PCIe link are managed as a transmit group and the receive lines of all of the lanes in a PCIe link are managed as a receive group. A separate power management and bandwidth negotiation is performed for transmit and receive and the results are set in transmit and receive registers maintained at the host and at the endpoint. This allows a transmit group to go to a low power, e.g. two or four active lines and the rest in a standby state, even as the receive group has more active lines and operates at high power., e.g. 8 or 16 receive lines, and vice-versa.

FIG. 1 is a block diagram of an example computing architecture using PCIe interfaces. The computing architecture 100 operates using multiple high-speed PCIe interface serial links A PCIe interface may be characterized as an apparatus comprising a point-to-point topology, where separate serial links connect each device to a host, which is referred to as a root complex 104. In the computing architecture 100, the root complex 104 couples a processor 102 to memory devices, e.g. the memory subsystem 108, and a PCIe switch circuit 106. In some instances, the PCIe switch circuit 106 includes cascaded switch devices. One or more PCIe endpoint devices 110 may be coupled directly to the root complex 104, while other PCIe endpoint devices 112-1, 112-2, . . . 112-N may be coupled to the root complex 104 through the PCIe switch circuit 106. The root complex 104 may be coupled to the processor 102 using a proprietary local bus interface or a standards defined local bus interface. The root complex 104 may control configuration and data transactions through the PCIe interfaces and may generate transaction requests for the processor 102. In some examples, the root complex 104 is implemented in the same Integrated Circuit (IC) device that includes the processor 102. The root complex 104 supports multiple PCIe ports.

The root complex 104 may control communication between the processor 102 and the memory subsystem 108 which is one example of an endpoint. The root complex 104 also controls communication between the processor 102 and other PCIe endpoint devices 110, 112-1, 112-2, . . . 112-N. The PCIe interface may support full-duplex communication between any two endpoints, with no inherent limitation on concurrent access across multiple endpoints. Data packets may carry information through any PCIe link. In a multi-lane PCIe link, packet data may be striped across multiple lanes. The number of lanes in the multi-lane link may be negotiated during device initialization and may be different for different endpoints.

When one or both traffic directions of the lanes of the PCIe links are being underutilized by low bandwidth applications that could be adequately be served by fewer lanes, then the root complex 104 and endpoint may operate the link with more or fewer transmit lines and receive lines in one or both directions. In some embodiments, lines of a link may be placed in one or more standby states in which some or all of the lines are operated in a low power or a no power mode. Varying the number of active lines for low bandwidth applications reduces the power to operate the link Supplying less power reduces current leakage, heat, and power consumption.

Figure 2:
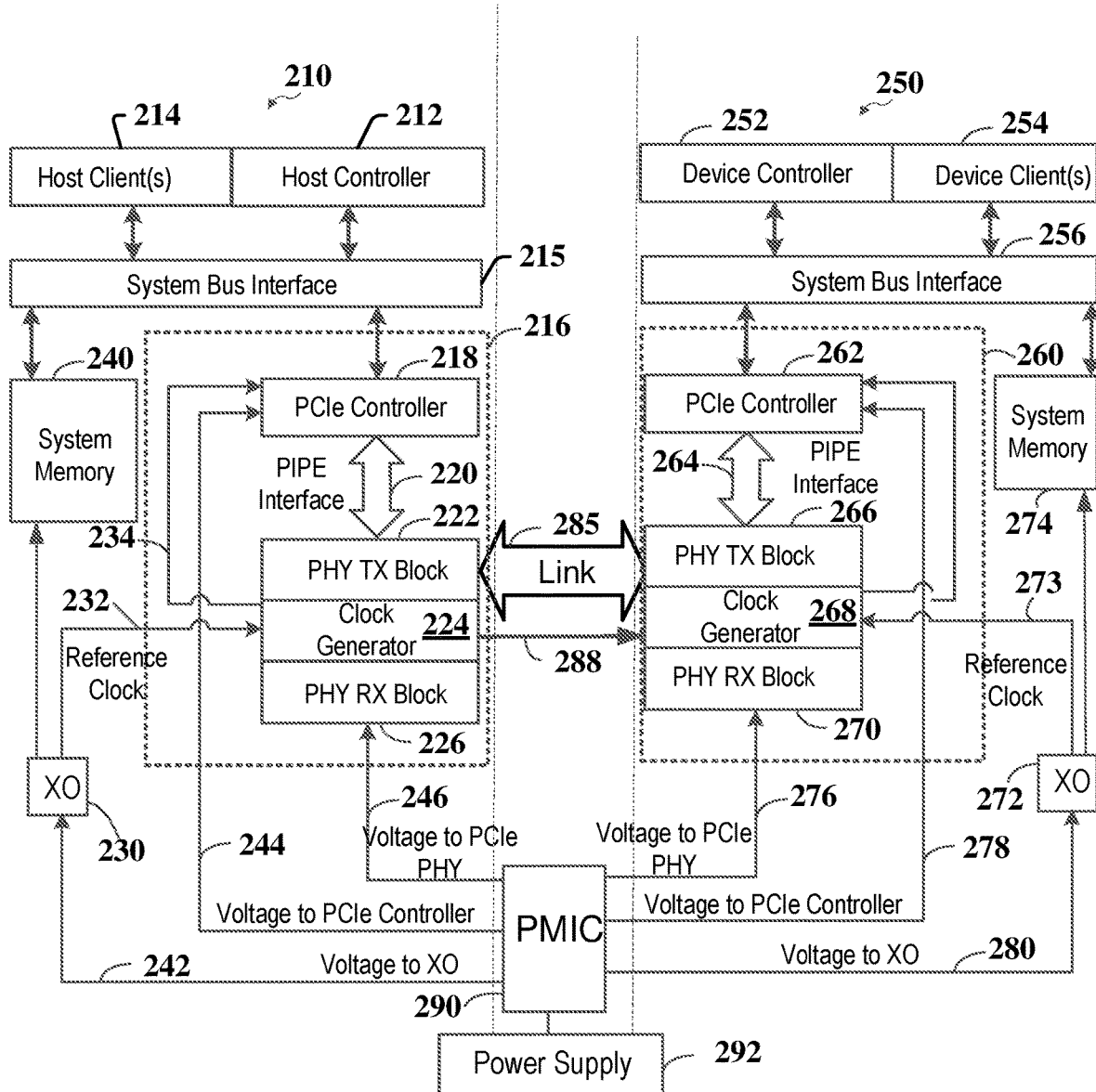
FIG. 2 is a block diagram of a system including a host system and an endpoint device system according to aspects of the present disclosure.

FIG. 2 is a block diagram of an exemplary PCIe system in which aspects of the present disclosure may be implemented. The system 205 includes a host system 210 and an endpoint device system 250. The host system 210 may be integrated on a first chip (e.g., system on a chip or SoC), and the endpoint device system 250 may be integrated on a second chip. Alternatively, the host system and/or endpoint device system may be integrated in first and second packages, e.g. SiP, first and second system boards with multiple chips, or in other hardware or any combination. In this example, the host system 210 and the endpoint device system 250 are coupled by a PCIe link 285.

The host system 210 includes one or more host clients 214. Each of the one or more host clients 214 may be implemented on a processor executing software that performs the functions of the host clients 214 discussed herein. For the example of more than one host client, the host clients may be implemented on the same processor or different processors. The host system 210 also includes a host controller 212, which may perform root complex functions. The host controller 212 may be implemented on a processor executing software that performs the functions of the host controller 212 discussed herein.

The host system 210 includes a PCIe interface circuit 216, a system bus interface 215, and a host system memory 240. The system bus interface 215 may interface the one or more host clients 214 with the host controller 212, and interface each of the one or more host clients 214 and the host controller 212 with the PCIe interface circuit 216 and the host system memory 240. The PCIe interface circuit 216 provides the host system 210 with an interface to the PCIe link 285. In this regard, the PCIe interface circuit 216 is configured to transmit data (e.g., from the host clients 214) to the endpoint device system 250 over the PCIe link 285 and receive data from the endpoint device system 250 via the PCIe link 285. The PCIe interface circuit 216 includes a PCIe controller 218, a physical interface for PCI Express (PIPE) interface 220, a physical (PHY) transmit (TX) block 222, a clock generator 224, and a PHY receive (RX) block 226. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and control flow functions specified in the PCIe specification, as discussed further below.

The host system 210 also includes an oscillator (e.g., crystal oscillator or "XO") 230 configured to generate a reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232. In this regard, the clock generator 224 may include a phase locked loop (PLL) or multiple PLLs, in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. The device controller 252 may be configured to receive bandwidth request(s) from one or more device clients, and determine whether to change the number of transmit lines or the number of receive lines based on bandwidth requests. The device controller 252 may be implemented on a processor executing software that performs the functions of the device controller.

The endpoint device system 250 includes a PCIe interface circuit 260, a system bus interface 256, and endpoint system memory 274. The system bus interface 256 may interface the one or more device clients 254 with the device controller 252, and interface each of the one or more device clients 254 and device controllers 252 with the PCIe interface circuit 260 and the endpoint system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as the host device) over the PCIe link 285 and receive data from the host system 210 via the PCIe link 285. The PCIe interface circuit 260 includes a PCIe controller 262, a PIPE interface 264, a PHY TX block 266, a PHY RX block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer and control flow functions.

The host system memory 240 and the endpoint system memory 274 at the endpoint may be configured to contain registers for the status of each transmit line and receive line of the PCIe link 285. The transmit lines may be configured as differential transmit line pairs and the receive lines may be configured as differential receive line pairs. These registers include group control registers and group status registers. In examples, the host system memory 240 and the endpoint system memory 274 both have a transmit group control register, a transmit group status register, and a transmit group capabilities register, among others, for the transmit group. The host system memory 240 and the endpoint system memory 274 both also have a receive group control register, a receive group status register, and a receive group capabilities register, among others for the receive group.

The endpoint device system 250 also includes an oscillator (e.g., crystal oscillator) 272 configured to generate a stable reference clock signal 273 for the endpoint system memory 274. In the example in FIG. 2, the clock generator 224 at the host system 210 is configured to generate a stable reference clock signal 273, which is forwarded to the endpoint device system 250 via a differential clock line 288 by the PHY RX block 226. At the endpoint device system 250, the PHY RX block 270 receives the EP reference clock signal on the differential clock line 288, and forwards the EP reference clock signal to the clock generator 268. The EP reference clock signal may have a frequency of 100 MHz, but is not limited to such frequency. The clock generator 268 is configured to generate multiple clock signals based on the EP reference clock signal from the differential clock line 288, as discussed further below. In this regard, the clock generator 268 may include multiple PLLs, in which each PLL generates a respective one of the multiple clock signals by multiplying up the frequency of the EP reference clock signal.

The system 205 also includes a power management integrated circuit (PMIC) 290 coupled to a power supply 292 e.g. mains voltage, a battery or other power source. The PMIC 290 is configured to convert the voltage of the power supply 292 into multiple supply voltages (e.g., using switch regulators, linear regulators, or any combination thereof). In this example, the PMIC 290 generates voltages 242 for the oscillator 230, voltages 244 for the PCIe controller 218, and voltages 246 for the PHY TX block 222, the PHY RX block 226, and the clock generator 224. The voltages 242, 244 and 246 may be programmable, in which the PMIC 290 is configured to set the voltage levels (corners) of the voltages 242, 244 and 246 according to instructions (e.g., from the host controller 212).

The PMIC 290 also generates a voltage 280 for the oscillator 272, a voltage 278 for the PCIe controller 262, and a voltage 276 for the PHY TX block 266, the PHY RX block 270, and the clock generator 268. The voltages 280, 278 and 276 may be programmable, in which the PMIC 290 is configured to set the voltage levels (corners) of the voltages 280, 278 and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244 and 246 and a second PMIC for generating voltages 280, 278 and 276. In this example, the first and second PMICs may both be coupled to the same power supply 292 or to different power supplies.

In operation, the PCIe interface circuit 216 on the host system 210 may transmit data from the one or more host clients 214 to the endpoint device system 250 via the PCIe link 285. The data from the one or more host clients 214 may be directed to the PCIe interface circuit 216 according to a PCIe map set up by the host controller 212 during initial configuration, sometimes referred to as Link Initialization, when the host controller negotiates bandwidth for the link. In examples, the host controller negotiates a first bandwidth for the transmit group of the link and negotiates a second bandwidth for the receive group of the link. At the PCIe interface circuit 216, the PCIe controller 218 may perform transaction layer and data link layer functions on the data e.g. packetizing the data, generating error correction codes to be transmitted with the data, etc.

The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a clock 234 for an appropriate data rate or transfer rate based on the reference clock signal 232, and input the clock 234 to the PCIe controller 218 to time operations of the PCIe controller 218. In this example, the PIPE interface 220 may include a 22-bit parallel bus that transfers 22-bits of data to the PHY TX block in parallel for each cycle of the clock 234. At 250 MHz this translates to a transfer rate of approximately 8 GT/s.

The PHY TX block 222 serializes the parallel data from the PCIe controller 218 and drives the PCIe link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the PCIe link 285, and deserializes the received data into parallel data. In this regard, the PHY RX block 270 may include one or more receivers and one or more deserializers. The clock generator 268 may generate a high-frequency clock for the one or more deserializers based on the EP reference clock signal. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system memory 240 via the PCIe link 285. In this regard, the PCIe controller 262 at the PCIe interface circuit 260 may perform transaction layer and data link layer functions on the data e.g. packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, error correction code, etc.). In one example, the clock generator 268 may generates a clock based on the EP reference clock through a differential clock line 288, and inputs the clock to the PCIe controller 262 to time operations of the PCIe controller 262.

The PHY TX block 266 serializes the parallel data from the PCIe controller 262 and drives the PCIe link 285 with the serialized data. In this regard, the PHY TX block 266 may include one or more serializers and one or more drivers. The clock generator 268 may generate a high-frequency clock for the one or more serializers based on the EP reference clock signal.

At the host system 210, the PHY RX block 226 receives the serialized data via the PCIe link 285, and deserializes the received data into parallel data. In this regard, the PHY RX block 226 may include one or more receivers and one or more deserializers. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

Figure 3:
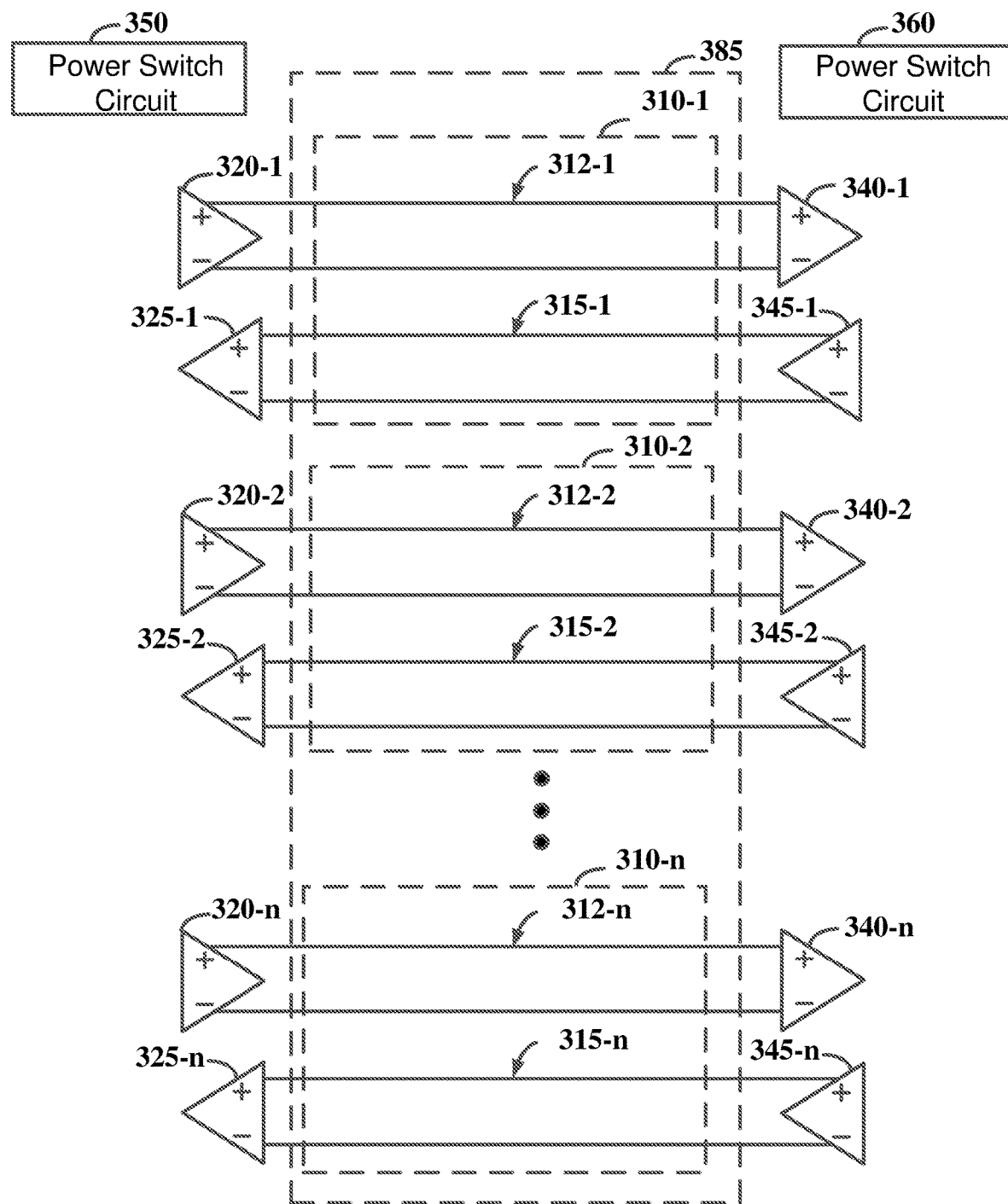
FIG. 3 is a diagram of lanes and corresponding drivers in a link according to aspects of the present disclosure.

FIG. 3 is a diagram of lanes in a link 385, e.g. the PCIe link 285, that may be used in the system of FIG. 1 and FIG. 2. In this example, the link 385 includes multiple lanes 310-1 to 310-$n$, in which each lane includes a respective first differential line pair 312-1 to 312-$n$ for sending data from the host system 210 to the endpoint device system 250, and a respective second differential line pair 315-1 to 315-$n$ for sending data from the endpoint device system to the host system 210. From the perspective of the host system, the first lane 310-1 is dual simplex, with a first differential line pair 312-1 as transmit lines and a second differential line pair 315-1 as receive lines. From the perspective of the endpoint device system, the first lane 310-1 has receive lines and transmit lines. The first differential line pairs 312-1 to 312-$n$ and the second differential line pairs 315-1 to 315-$n$ may be implemented with metal traces on a substrate (e.g., printed circuit board), in which the host system may be integrated on a first chip mounted on the substrate and the endpoint device is integrated on a second chip mounted on the substrate. Alternatively, the link may be implemented through an adapter card slot, a cable, or a combination of different media. The link may also include an optical portion in which the PCIe packets are encapsulated within a different system. In this example, when data is sent from the host system to the endpoint device system across multiple lanes, the PHY TX block 222 may include logic for partitioning the data among the lanes. Similarly, when data is sent from the endpoint device system to the host system 210 across multiple lanes, the PHY TX block 266 may include logic for partitioning the data among the lanes.

The PHY TX block 222 of the host system 210 shown in FIG. 2 may be implemented to include a transmit driver 320-1 to 320-$n$ to drive each first differential line pair 312-1 to 312-$n$ to transmit data and the PHY RX block 270 of the host shown in FIG. 2 may be implemented to include a receiver 340-1 to 340-$n$ (e.g., amplifier) to drive each second differential line pair 312-1 to 312-$n$ to receive data. Each transmit driver 320-1 to 320-$n$ is configured to drive the respective differential line pair 312-1 to 312-$n$ with data and each receiver 340-1 to 340-$n$ is configured to receive data from the respective first differential line pair 312-1 to 312-$n$. Also, in FIG. 2, the PHY TX block 266 of the endpoint device system 250 may include a transmit driver 345-1 to 345-$n$ for each second differential line pair 315-1 to 315-$n$ and the PHY RX block 226 of the host system 210 may include a receiver 325-1 to 325-$n$ (e.g., amplifier) for each second differential line pair 315-1 to 315-$n$. Each transmit driver 345-1 to 345-$n$ is configured to drive the respective second differential line pair 315-1 to 315-$n$ with data and each receiver 325-1 to 325-$n$ is configured to receive data from the respective second differential line pair 315-1 to 315-$n$.

In certain aspects, the width of the link 385 is scalable to match the capabilities of the host system and the endpoint. The link may use one lane 310-1 for an x1 link, two lanes, 310-1, 310-2 for an x2 link or more lanes for wider links up to n lanes from 310-1 to 310-$n$. Currently links are defined for 1, 2, 4, 8, 16, and 32 lanes, although a different number of lanes may be used to suit particular implementations.

In one example, the host system 210 may include a power switch circuit 350 configured to individually control power to the transmit drivers 320-1 to 320-$n$ and the receivers 325-1 to 325-$n$ from the PMIC 290. Therefore, in this example, the number of drivers and receivers that are powered on scales with the width of the link 385. Similarly, the endpoint device system 250 as was shown in FIG. 2 may include a power switch circuit 360 configured to individually control power to the transmit drivers 345-1 to 345-$n$ and the receivers 340-1 to 340-$n$ from the PMIC 290. In this way the host system sets a number of the plurality of drivers to be selectively powered by the power switch circuit to change a number of active transmit lines or receive lines based on the number of lines that are powered. With differential signaling the lines will be set as active or standby in pairs.

Figure 4:
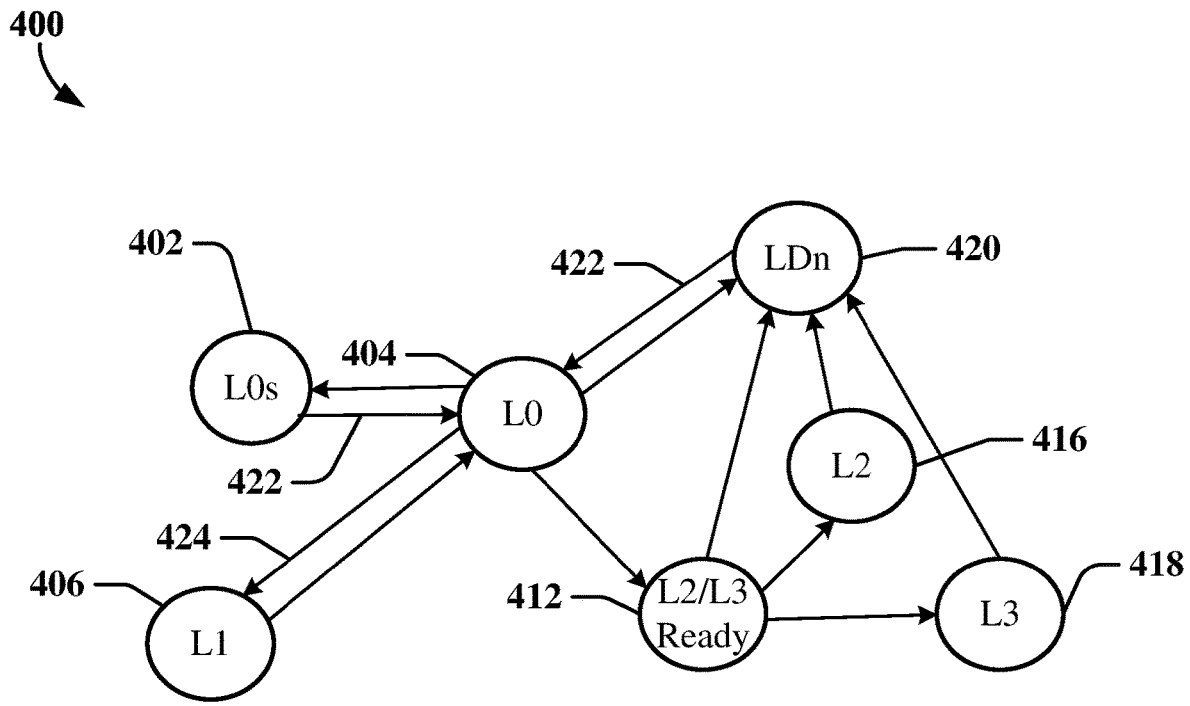
FIG. 4 is a state diagram illustrating the operation of a power management state machine according to aspects of the present disclosure.

FIG. 4 is a state diagram 400 illustrating the operation of a power management state machine in accordance with certain aspects disclosed herein. The Active State Power Management (ASPM) protocol is a state machine approach to reduce power based on link activity detected over the PCIe link between the root complex and an endpoint PCIe device. The state diagram is consistent with the Link Training and Status state machine (LTSSM) as defined for PCIe. However, other approaches may be used instead. In this approach, the link operates in an L0 power state (i.e., link operation state) when data is being transferred over the PCIe link. In this example an L0 state 404 and an L1 state 406 are illustrated. The ASPM protocol may also support additional active and standby states and substrates, e.g. an L1.1 and L1.2 sub-state, etc. As shown, the L1 state 406 is accessible only through a connection to the L0 state 404. An ASPM state change may be initiated when conditions on a link dictate or suggest that a transition between states is desired or appropriate. Both communication partners on the link may initiate power state change requests when conditions are right When the link is idle (e.g., for a short time interval between data bursts), the link may be taken from the L0 state 404 to a standby state L0s 402 which is accessible only through a connection to the L0 state 404. In this example, L0s 402 is a low power standby for L0 404. The L1 state 406 is a standby state with a lower latency than L0s state 402. The L0s state 402 serves as a standby state and also serves as an initialization state after a power-on, system reset, or after an error condition is detected. In L0s 402, device discovery and bus configuration processes may be implemented before the link transitions 422 to L0 404. In L0 404, PCIe devices may be active and responsive to PCIe transactions, and/or may request or initiate a PCIe transaction. The L1 state 406 is a primary standby state and allows for a quick return to the L0 state 404. The L1 state 406 may be entered through a transition 424 when a PCIe device determines that there are no outstanding PCIe requests or pending transactions. Power consumption may be reduced by disabling or idling transceivers in PCIe bus interfaces, disabling, gating, or slowing clocks used by the PCI device, and disabling PLL circuits used to generate clocks used to receive data. A PCIe device may make the transition 424 to the L1 state 406 through the operation of a hardware controller or some combination of operating system and hardware control circuits When the PCIe link is inactive for a longer time, then the link may go to an L2 state 416 or L3 state 418 through an L2/L3 ready state 412 for even lower power consumption. The L2/L3 ready state 412 is a pseudo-state to prepare the link components for a loss of power and a loss of the reference clocks. The L2 state 416 and the L3 state 418 are further power reduced and have a longer latency than the L1 state 406. Additional lower power states may be provided to suit other implementations.

When the PCIe link becomes active while a device is operated in the L2 state 412 or L3 state L3 418, a return to the L0 state 404 is initiated for the device. A direct transition to the L0 state 404 may not be available. The PCIe link may transition 416 to a recovery state, the LDn state 420 in which the transceivers in the PCIe bus interfaces, clocks used by the PCI device, and/or PLL circuits are enabled. When the transceivers and other circuits are determined to be functional, then a transition 422 from the LDn state 420 to the L0 state 404 may be initiated. The LDn state 420 may also be entered into through a reset or link disable operation.

In some examples, the ASPM protocol determines whether the transition 424 to the L1 state 406 should be initiated based on a finite time interval or threshold defined as the L1 entry latency. Similar thresholds may be defined for the L2 state 416, L3 state 418 and other states. The L1 state 406 is a link power state which does not permit data transfers over the PCIe link Whenever the PCIe link is inactive for the given L1 entry latency duration, a PCIe controller may request a link partner to enter a lower-power link state in order to save power. In some instances, the L1 entry latency duration is chosen based on overall system parameters, activity and/or pending operations. In some modes of operation, the ASPM protocol may be configured to conserve power by reducing the transmission time during which the PCIe link is active and consuming power. During high bandwidth bursts some modes may be configured to avoid link transitions to low power states that would otherwise extend the transmission time. The ASPM may initiate a transition to a low power state transition after an observed link inactivity time. The particular entry latency duration may be adapted to suit different system architectures and device characteristics. The packet latency between data read/write requests in a PCIe interface can vary in some implementations, between e.g. 1 µs and 40 µs.

By reducing the link width during low throughput data traffic scenarios, subsystems of the PCIe link scale down voltage levels (e.g., to lower operating levels that satisfy current throughput over the PCIe link). The scaled down one or more voltage levels reduce power consumption (e.g., reduce leakage currents during sustained low throughput traffic or in idle use case). The number of lanes also affect power consumption. In effect, there is an L0, L1 transition state diagram for each lane.

Figure 5:
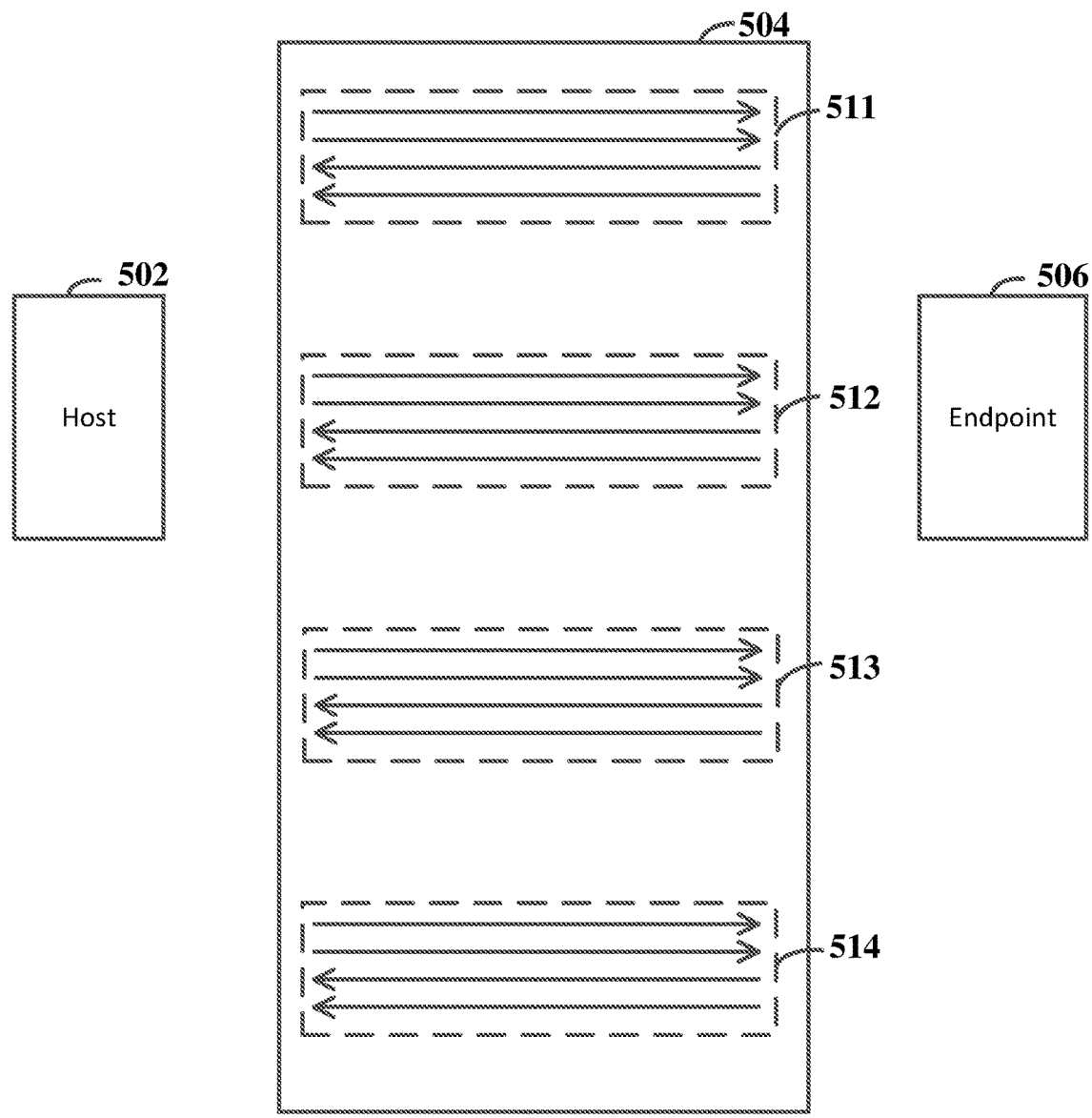
FIG. 5 is a block diagram of duplex traffic lanes of a link between a host and an endpoint according to aspects of the present disclosure.

FIG. 5 is a diagram of a link 504 such as a PCIe link of duplex traffic lanes between a host 502 and an endpoint 506. The duplex traffic lanes may have the same physical structure as in FIG. 3 but are generalized to show how lanes are bucketized in a typical configuration. The link 504 includes four lanes 511, 512, 513, 514, although more or fewer may be used. Each lane includes two transmit lines as a differential line pair lines and two receive lines as a differential line pair for four lines per lane and sixteen lines for the x4 link Based on the example in FIG. 3, the PHY TX block 222 shown in FIG. 2 may be implemented to include a transmit driver for each differential pair of two transmit lines and the PHY RX block 270 shown in FIG. 2 may be implemented to include a receiver for each differential pair of two receive lines.

In certain aspects, the width of the link 504 is scalable by controlling the number of lanes 511, 512, 513, 514 that are active. The host 502 or the endpoint 506 may configure the link width by configuring the number of traffic lanes that are powered to transmit and receive data through the link 504. In the case of high transmit or receive traffic all of the traffic lanes are activated. If both transmit and receive traffic are low or if there is traffic inactivity, then one or more duplex traffic lanes may be put in a low power state, e.g. the L1 state.

Figure 6:
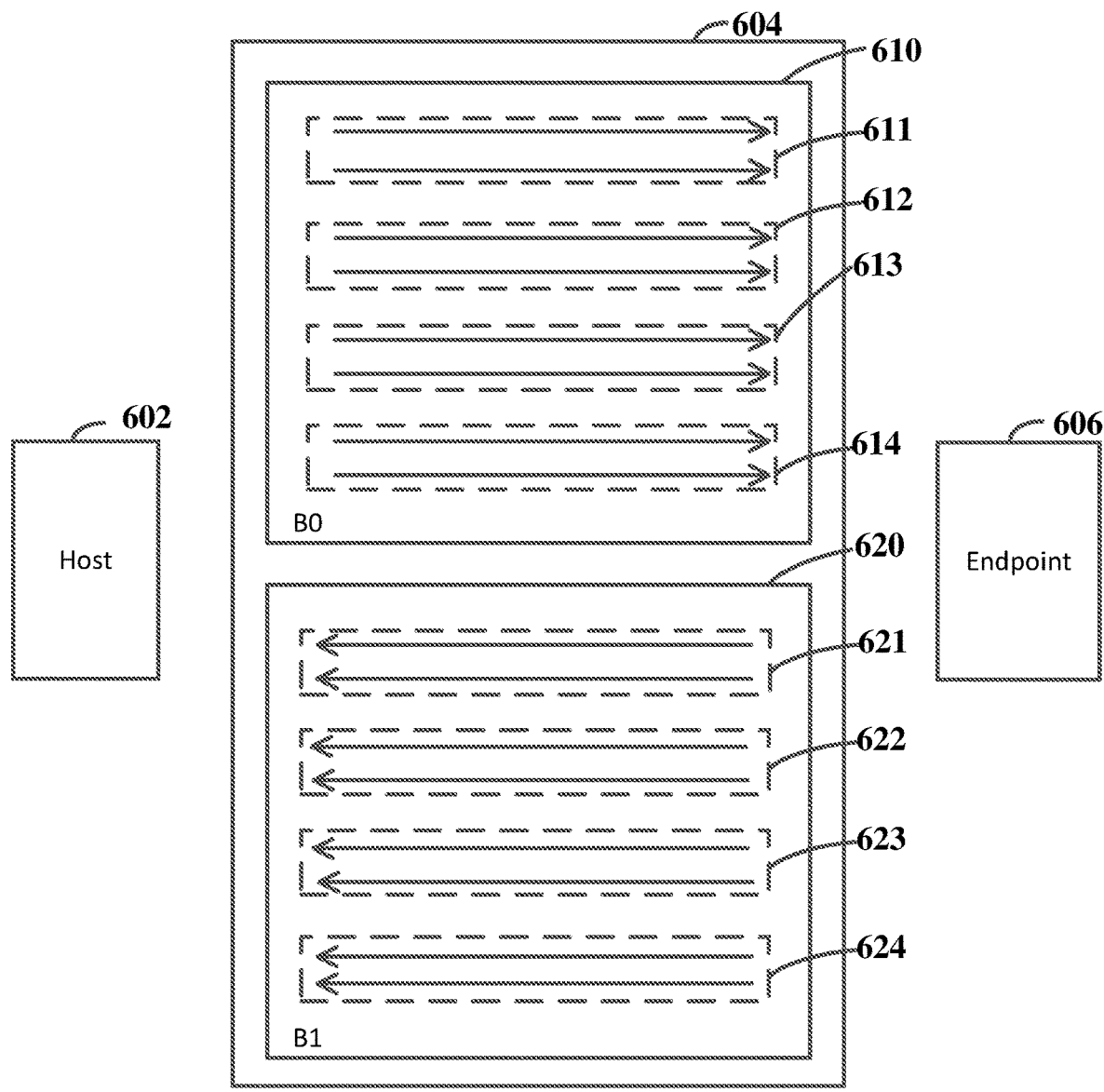
FIG. 6 is a block diagram of duplex traffic lanes of a link grouped as a transmit group and a receive group according to aspects of the present disclosure.

FIG. 6 is a diagram of duplex traffic lanes of a link 604 between a host 602 and an endpoint 606 that are grouped as a transmit group 610 and a receive group 620. The link may be a PCIe link that may have the same physical structure as in FIG. 3 but in which the lanes have been logically bucketized into a bucket for the host transmit group 610 and a bucket for the host receive group 620. The host transmit bucket (B0) is also an endpoint receive bucket and the host receive bucket (B1) is also an endpoint transmit bucket. In this example, the link 604 includes four lanes, although more or fewer may be used. The transmit group 610 includes four transmit differential line pairs 611, 612, 613, 614, one for each of four lanes, that are logically bucketized in the host transmit group 610 for sending data from the host 602 to the endpoint 606. The receive group 620 includes four receive differential line pairs 621, 622, 623, 624 that are logically bucketized in the host receive group 620 for receiving data from the endpoint 606 at the host 602. Using the bucketization shown in FIG. 6, the PHY TX block 222 may include logic for partitioning the data among the transmit lines of the transmit group 610 and the PHY RX block 226 may include logic for partitioning data among the receive lines of the receive group 620 independently of the transmit group. Similarly, when data is sent from the endpoint 606 to the host 602 across multiple lines, the PHY TX block 266 may include logic for partitioning the data among the transmit lines of the transmit group independent of the receive lines of the receive group.

As described above, each differential line pair includes a driver and a receiver, so that if any one differential line pair in either direction is placed in a low power or standby state, power is reduced. In this example, the number of active transmit lines is scalable for the transmit group 610 within the link 604, independently of the power of the receive lines of the receive group 620. Similarly, the number of active receive lines within the receive group 620 is scalable independent of the power of the transmit lines of the transmit group 610.

As described above, a host system 210 may include a power switch circuit 350 configured to individually control power to the transmit drivers 320-1 to 320-n and the receivers 325-1 to 325-n from the PMIC 290. In this regard, the power switch circuit 350 may couple the transmit drivers and receivers of the active lines to the voltage 246, and decouple the transmit drivers and receivers of the inactive lines from the voltage 246. Therefore, the number of transmit drivers and receivers that are powered on scales with the number of active lines in the transmit group and the number of active lines in the receive group. The endpoint may also include a power switch circuit 360 to individually control power to transmit and receive drivers. For ease of illustration, the individual connections or couplings between power switch circuits, drivers, and receivers are not shown in FIG. 6.

In some examples a threshold process may be used to determine whether to transition to the standby state or transition from a standby state for any particular transmit line or receive line or for the transmit group or the receive group as a whole. As an example, a process may be to monitor transmit traffic activity for a link, compare the transmit traffic activity of the link to a threshold, and manage a first power of transmit lines of the link as a transmit group in accordance with the transmit traffic activity. The process may manage the first power by placing one or more of the transmit lines or one or more differential line pairs of the transmit lines into a standby substate in response to the transmit traffic activity being less than the threshold. The standby substate is a lower power state than the standby state. As an alternative, traffic inactivity may be compared to a threshold. The receive traffic at the endpoint corresponds to the transmit traffic at the host so that either or both processes may be used to determine appropriate power management for the link.

This process may be represented as shown below as thread0. LINK_STATE_B0 refers to the link state for the transmit group B0 which has an active state, L0 B0, an inactive state L1 B0, and an inactive substate L1SS B0, although there may be multiple substates with different numbers of inactive transmit lines. EP refers to the endpoint, RX_traffic_inactivity_at_EP refers to a monitored amount of receive traffic activity at the endpoint which corresponds to transmit traffic inactivity at the receiver. changeLinkState refers to a command from the process to a link controller. In the example of the thread0 process, the process may be applied when the link state for the transmit group B0 is in either an L1 standby state or L1SS standby substate. The process compares the receive traffic inactivity at the endpoint to a threshold for the L1SS substate. If the receive traffic inactivity is greater than the threshold, then the link state is set to the standby substate L1SS if not, then the link state is set to the standby state L1.

monitored traffic activity use or settings to a number of active differential line pairs. On the transmit side, the monitored transmit traffic activity is applied to one or more thresholds in the first column 710. The monitored traffic activity may be an aggregate bandwidth for the case of multiple clients. The traffic may be measured as a data rate, e.g. Mbps or another format, intervals between packets, or in other units. Traffic inactivity may be used instead and may be measured in units of time, a data rate, or other units. The transmit traffic activity is converted through the lookup table to a number of active differential line pairs in the second column 720 using a threshold in the first column 710. The second column 720 has a corresponding number of active differential line pairs (labeled "1" to "32") and the first column provides the threshold that triggers a transition from one number of active differential line pairs to another number of active differential line pairs for each range of traffic activity that lies between the thresholds. An x4 link may support 1, 2, 3, or 4 active differential line pairs, depending on traffic or traffic inactivity. While the second column provides a number of active differential line pairs, it does not provide which ones of the available differential line pairs are selected for an active state.

```
thread0
while(LINK_STATE_B0 = L1 B0 || LINK_STATE_B0 = L1SS B0){
    if        (RX_traffic_inactivity_at_EP  >  L1SS   B0_THRESHOLD):
              LINK_STATE_B0           =            L1SS        B0
    else
              LINK_STATE_B0           =            L1          B0
    changeLinkState                              (LINK_STATE_B0)
}
```

A similar process may be performed for receive traffic at the host by comparing activity or inactivity to a threshold. In one example, a process is to monitor receive traffic activity for a link, compare the receive traffic activity of the link to a threshold, and manage a second power of receive lines of the link as a receive group in accordance with the receive traffic activity. The process may manage the second power by placing the receive traffic lines of the link into a standby state or standby substate, e.g. L1 or L1SS, in response to the receive traffic activity being less than the threshold.

This process may be represented as in thread1 below. In the example of the thread1 process, the process may be applied when the link state for the transmit group B1 is in either an L1 standby state or L1SS standby substate. The process compares the receive traffic inactivity at the host or receiver to a threshold for the L1SS substate. If the receive traffic inactivity is greater than the threshold, then the link state is set to the standby substate L1SS if not, then the link state is set to the standby state L1.

The third column 730 provides thresholds for use against the monitored receive traffic activity. These receive traffic activity thresholds also map to a number of active differential line pairs in the fourth column 740 in the same way. There may be a different table for transmit and receive or the same table may be used to solve for both transmit and receive numbers of active differential line pairs. The thresholds may be the same or different. For the transmit traffic activity, the controller places the determined number of active transmit differential line pairs into an active state and the remaining transmit differential line pairs into a standby substate in response thresholds. For the receive traffic activity, the controller places the determined number of active receive differential line pairs into an active state and the remaining transmit differential line pairs into a standby substate in response thresholds.

The table 700 may be prestored in memory coupled to a bandwidth solver of a PCIe controller 218, 262. When the bandwidth solver monitors the transmit traffic activity and

```
thread1
while(LINK_STATE_B1 = L1 B1 || LINK_STATE_B1 = L1SS B1){
    if        (RX_traffic_inactivity_at_RC  >  L1SS   B1_THRESHOLD):
              LINK_STATE_B1           =            L1SS        B1
    else
              LINK_STATE_B1           =            L1          B1
    changeLinkState                              (LINK_STATE_B1)
}
```

Additional threshold processes may be established for each link width transition in each direction. FIG. 7 is an example of a table 700, e.g. a lookup table for mapping the receive traffic activity from one or more clients. The bandwidth solver may convert the monitored traffic activity into a number of active transmit differential line pairs and active receive differential line pairs by applying one of the thresholds. The table 700 may be generated based on computer simulations of the system and/or power measurements of the system for various traffic activity and active line scenarios. In this example, the number of active lines that results in the lowest power for a particular bandwidth based on simulation results and/or power measurements may be mapped to an appropriate traffic activity threshold in the table 700.

FIG. 8 is a table 800 of power modes suitable for either a transmit group, designated here as B0, or a receive group, designated here as B1. In this example there are four differential line pairs, however, more or fewer differential line pairs may be used. The differential line pairs are designated in the table 800 as L1, L2, L3, and L4. Each differential line pairs may be inactive, indicated as "1," or active, indicated as "0." Referring to the table 800, there is one unique state, indicated as 0x0 in which all of the lines are active. In this state none of the lines are configured in a low power state, e.g. L1. This may be used as a default state for quick response. There is one unique state, indicated as 0x9 in which all of the lines are inactive. All the lines may be in a low power state e.g. L1. Such a state may be entered after monitoring the traffic and comparing traffic activity or inactivity to thresholds e.g. those of FIG. 7. The other states correspond to one inactive differential line pair (two lines), indicated as 0x1, two inactive differential line pairs (four lines), indicated as 0x3, and three inactive differential line pairs (6 lines), indicated as 0x7. For PCIe links configured as x1, x2, x8, x16 or x32, etc. other codes may be used to suit the more or fewer states. The codes are stored in registers with the host or endpoint controller for use in controlling the states of the transmit lines and the receive lines. FIG. 8 shows that for each number of differential line pairs from FIG. 7, there may be multiple possible configurations of a group of differential line pairs. The values such as 0x7 correspond to a number such as "1" from the table 700 of thresholds. The sequence or order of placing lines in an active or standby state may be adapted to suit particular configurations and implementations.

Figure 9:
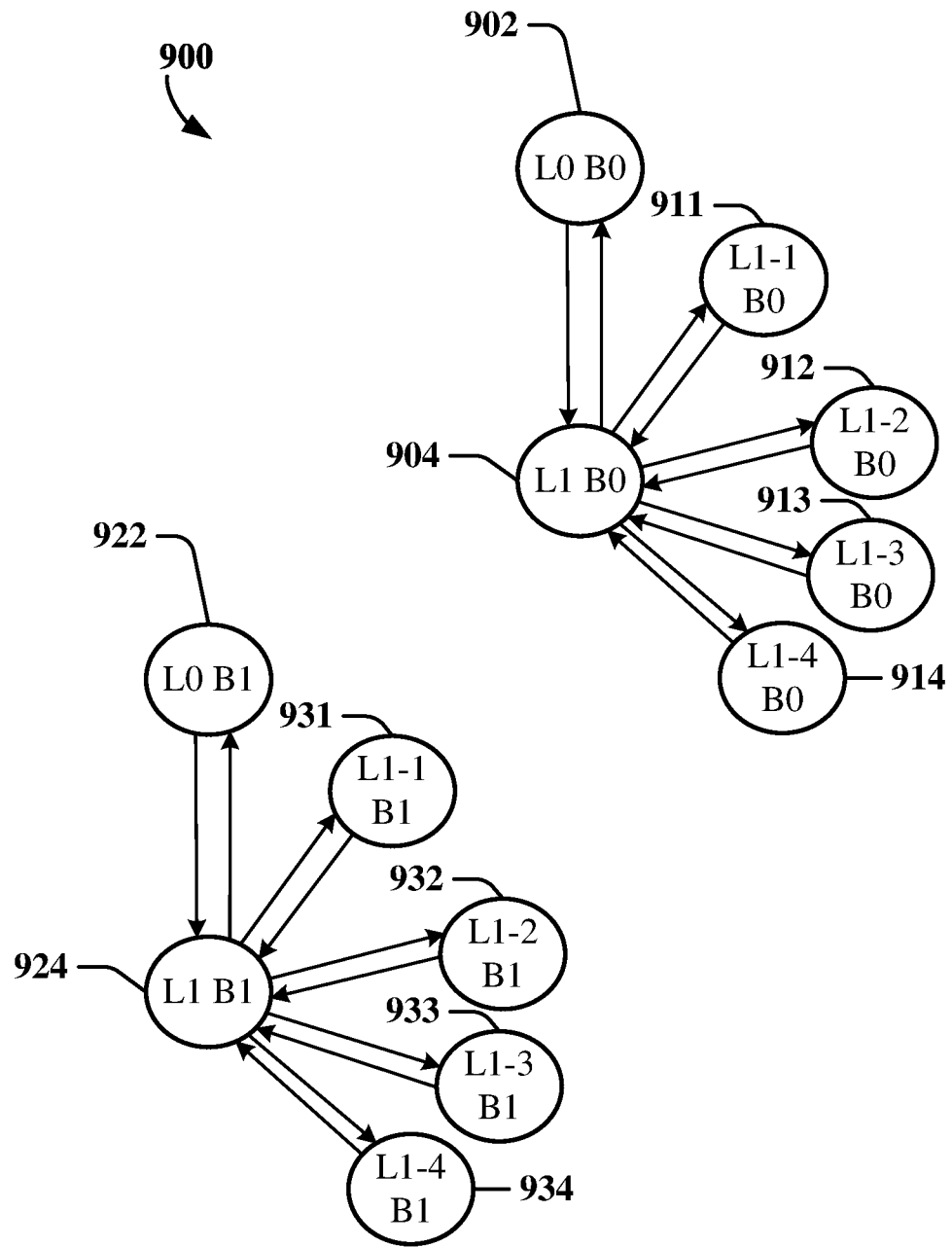
FIG. 9 is a state diagram illustrating a portion of a power management protocol for transmit and receive states for an x4 link according to aspects of the present disclosure.

FIG. 9 is a state diagram illustrating a portion of a power management protocol in which there are five inactive substates of the L1 state. The states and sub-states may be applied independently to the transmit group and to the receive group. On the transmit side, for the logical transmit bucket B0, there is an active L0 B0 state 902 that is the same as or similar to the L0 state 404 described with respect to FIG. 4 but only for the transmit bucket. The L0 B0 state 902 transitions to and from an inactive or standby L1 B0 state 904 also the same as or similar to the L1 state 406 of FIG. 4 but only for the transmit bucket. The standby state L0 B0 904 has four substates. These four substates correspond to the number of active transmit differential line pairs indicated, for example, with the codes of FIG. 8, 0x0, 0x1, 0x3, 0x7, 0x9, as determined using thresholds, for example, the thresholds of FIG. 7. A controller, e.g. a PCIe controller, places at least one of the transmit differential line pairs in a standby state in response to the negotiated bandwidth or the selected bandwidth. The selected at least one transmit differential line pair may be any of the transmit differential line pairs of the transmit group.

A first standby substate L1-1 B0 911 for 0x9 is a state of four standby differential line pairs of the transmit group. There are no active lines of the transmit group. This state corresponds to the standard standby state L1 B0 904 and may be replaced by that state. A second standby substate L1-2 B0 911 is a state for 0x7 of three standby differential line pairs and one active differential line pair of the transmit group. A third standby substate L1-3 B0 913 for 0x3 is a state for two standby differential line pairs and two active differential line pairs. A fourth standby substate L1-4 B0 914 is a state for 0x1 of one standby differential line pair and four active differential line pairs. A fifth state for 0x0 with all active lines corresponds to L0 B0 902. In this example, there are four substates for an x4 link There may be more or fewer substates to suit different numbers of lines and different implementations. In some examples, not every combination is used. As an example, an x16 link is capable of 17 different numbers of standby lines, however, a system may be configured to use only 8 or another number of combinations of lines that is less than the maximum number for simplicity.

On the receive side for the logical receive bucket B1, there is an active L0 B1 state 922 with all four receive differential line pairs active that is the same as or similar to the L0 state 404 described with respect to FIG. 4 but only for the receive bucket. The L0 B1 state 922 transitions to and from an inactive or standby L1 B1 state 924 also the same as or similar to the L1 state 406 of FIG. 4 but only for the receive bucket. A controller, e.g. a PCIe controller, then places a selected at least one of the receive differential line pairs in a standby state using the thresholding and the traffic activity. The at least one transmit differential line pair may be selected in accordance with a lane sequence negotiation or in another way. The L1 B1 state is for 0x9 with all lines inactive or may be used as a transitional state into the substates. The standby state L1 B1 924 has four substates. These four substates correspond to the number of active receive traffic lines indicated, for example, with the codes of FIG. 8, 0x0, 0x1, 0x3, 0x7, 0x9, as determined using thresholds, for example, the thresholds of FIG. 7. A first standby substate L1-1 B1 931 for 0x9 is a state of four standby differential line pairs of the receive group. There are no active lines of the receive group. This state corresponds to the standard standby state L1 B1 924 and may be replaced by that state. A second standby substate L1-2 B1 931 is a state for 0x7 of three standby differential line pairs and one active differential line pair of the receive group. A third standby substate L1-3 B1 933 for 0x3 is a state for two standby differential line pairs and two active differential line pairs. A fourth standby substate L1-4 B1 934 is a state for 0x1 of one standby differential line pair and three active differential line pairs. There may be more or fewer than four substates to suit different numbers of lines and different implementations and not every combination is used in every example. While the substates are shown as substates of a corresponding standby state, 904, 924, the substates have a mix of standby and active status and may instead be substates of an active state 902, 922.

Figure 10:
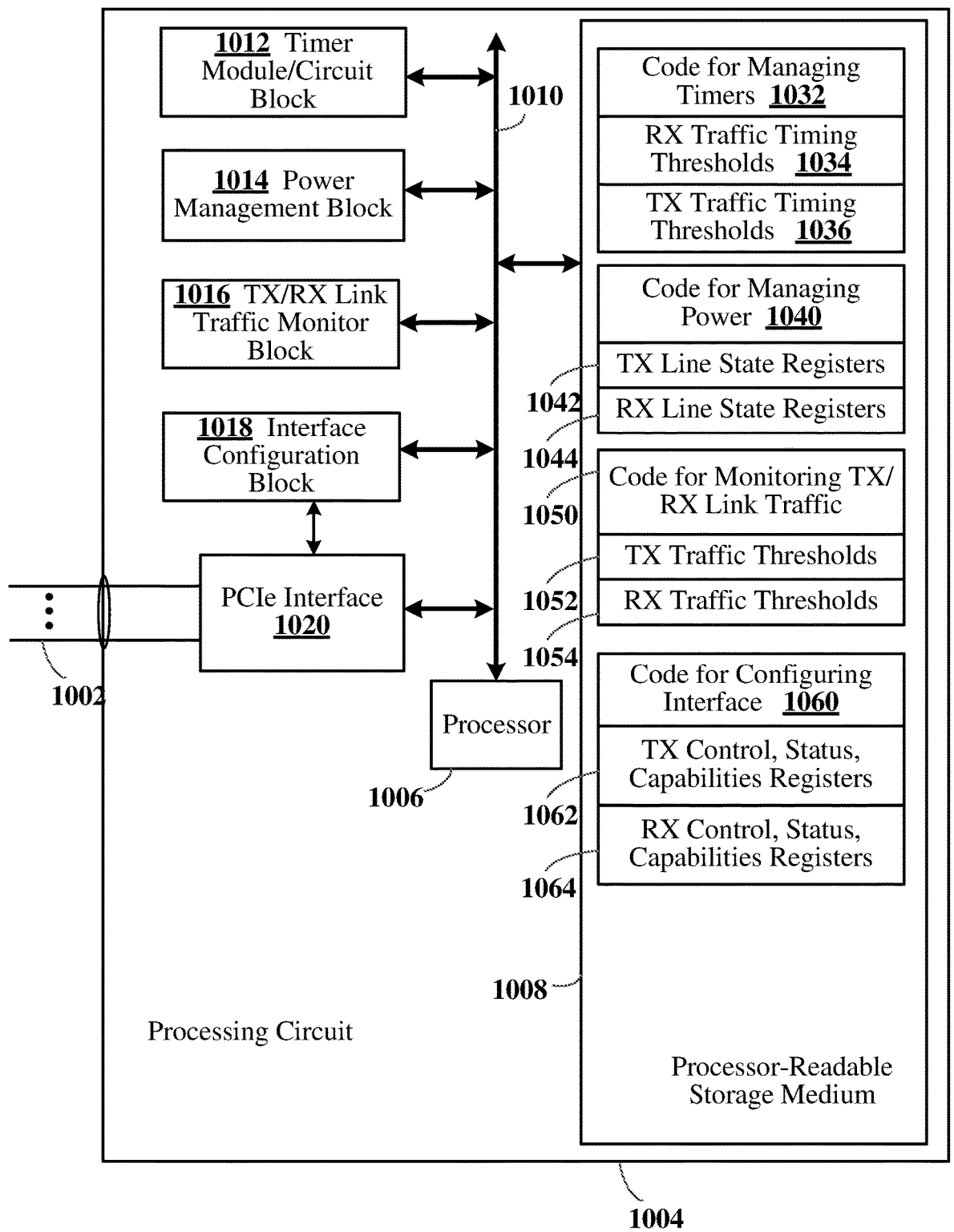
FIG. 10 is a block diagram of a PCIe link interface processing circuit according to aspects of the present disclosure.

FIG. 10 is a block diagram of a link interface processing circuit. The processing circuit 1004 is an apparatus that may be a part of a host or an endpoint. It is coupled to a link 1002, e.g. a PCIe link, with multiple duplex lanes. The link 1002 is coupled at an opposite end to another PCIe device e.g. an endpoint or a host. Data and control information communicated as packets through the link 1002 are coupled to a link 1020 which provides a PHY level interface to the link and converts baseband signals to packets. The data and control packets are sent through the link 1020 through a bus 1010 to other components of the processing circuit 1004. The link 1020 has a direct connection to an Interface Configuration Block 1018 for configuration and control settings for the operation of the link 1020.

The processing circuit 1004 comprises blocks and memory. A Timer Module/Circuit Block 1012 is coupled to the bus 1010 operates timing for latency, inactivity, acknowledgement and to drive standby states. The Timer Module/Circuit Block 1012 accesses a computer-readable storage medium 1008 to access code for managing timers 1032. In aspects, the storage medium is a non-transitory computer-readable medium. The Timer Module/Circuit Block 1012 may also access registers in the storage medium 1008 that contain receive traffic timing thresholds 1034 and transmit traffic timing thresholds 1034, e.g. an L1 B0_THRESHOLD or L1 B1_THRESHOLD, discussed above or other thresholds as in FIG. 7 to measure durations within a PCIe link.

Also within the processing circuit 1004, a Power Management Block 1014 manages power to each line and to other components of the PCIe system. The Power Management Block 1014 has access through the bus 1010 to code for managing PCIe power 1040 and to transmit line state registers 1042 and receive line state registers 1044. These registers may be used to store a state for each transmit line and each receive line, for each transmit group and each receive group or for a transmit side of a link and a receive side of the link. The state may be determined using the code for managing timers 1032, the code for managing PCIe power 1040, or in another way.

A TX/RX Link Traffic Monitor Block 1016 within the processing circuit 1004 has access to the bus 1010 to monitor the transmit traffic activity on the link 1002 and to monitor receive traffic activity on the link 1002. Traffic activity and traffic inactivity may be monitored. The TX/RX Link Traffic Monitor Block 1016 has access to code for monitoring TX/RX Link Traffic 1050 in the storage medium 1008 and also to registers to store results and to obtain traffic activity thresholds. Transmit traffic activity thresholds 1052 and receive traffic activity thresholds 1054, e.g. the thresholds of the first column 710 of FIG. 7, are available for use in comparing traffic activity to a threshold separately for both transmit traffic activity and receive traffic activity. The Power Management Block 1014 may manage power of the transmit lines and power of the receive lines in accordance with the transmit traffic activity and the receive traffic activity. The Interface Configuration Block 1018 may modify the configuration in response to the Power Management Block 1014.

The Interface Configuration Block 1018 is coupled to the bus as are the TX/RX Link Traffic Monitor Block 1016, Power Management Block 1014, and the Timer Module/Circuit Block 1012 so that each of these blocks may communicate with each other, with the storage medium 1008 and to a processor 1006. The processor 1006 controls the operation of the other blocks and instigates instances of each block as appropriate to operation of the processing circuit 1004. The Interface Configuration Block 1018 also has access to code for configuring the PCIe interface 1060. On executing this code, the Interface Configuration Block 1018 reads and writes values from a variety of configuration registers. These registers include transmit control, status, and capabilities registers 1062 and receive control, status, and capabilities registers. These registers may be accessed and read at the start of Link Initialization and then updated with the result of the initialization. The registers may also be modified in response to power management and bandwidth negotiations or to change the status of one or more transmit lines or receive lines of the link 1002.

The processing circuit 1004 may initialize the link 1002, manage the power, and change the number of active lines of the link 1002. In operation, bandwidth requests may also be received from the host or endpoint. Bandwidth requests may cause a bandwidth negotiation followed by a change in values set to control, status, and capabilities registers. The number of active lines may then be changed in response to transmit traffic activity and receive traffic activity. The TX/RX Link Traffic Monitor Block 1016 also monitors transmit traffic activity for the transmit lines of the link 1002 and monitors the receive traffic activity for the receive lines of the link 1002. The transmit traffic activity and receive traffic activity are evaluated to determine a change of the number of active lines. The Power Management Block 1014 may place one or more transmit or receive lines into a standby state. The state change may then be recorded in transmit line state registers 1042 and receive line state registers 1044. The evaluation may be performed in different ways. In some examples, the transmit traffic activity is compared to one or more thresholds in transmit traffic threshold registers 1052 and the receive traffic activity is compared to one or more thresholds in receive traffic threshold registers 1054 at the TX/RX Link Traffic Monitor Block 1016. A message may then be sent to the connected device, the host or endpoint, through the link 1002.

Upon changing the number of active lines, the Power Management Block 1014 may change the voltage levels of one or more of the voltages 276, 278, and 280 by instructing the PMIC 290 to set the voltage levels of one or more of the voltages supplied by the PMIC 290 as shown in FIG. 2. The Power Management Block 1014 may also connect or disconnect power to drivers and receivers of affected lines in accordance with a new number of active lines. As an example, if the number of active lines is decreased, then the Power Management Block 1014 may power down the drivers in the PHY TX block 222 and/or the receivers in the PHY RX block 226 corresponding to the lines in the link 1002 that are being deactivated because of the change. The Power Management Block 1014 may power down selected drivers and/or receivers by sending instructions to a power switch circuit to turn off the selected drivers and/or receivers. So a power according to the negotiated bandwidth is managed by supplying one or more voltages to the interface circuit of the link and by setting the levels of the one or more voltages.

Figure 11:
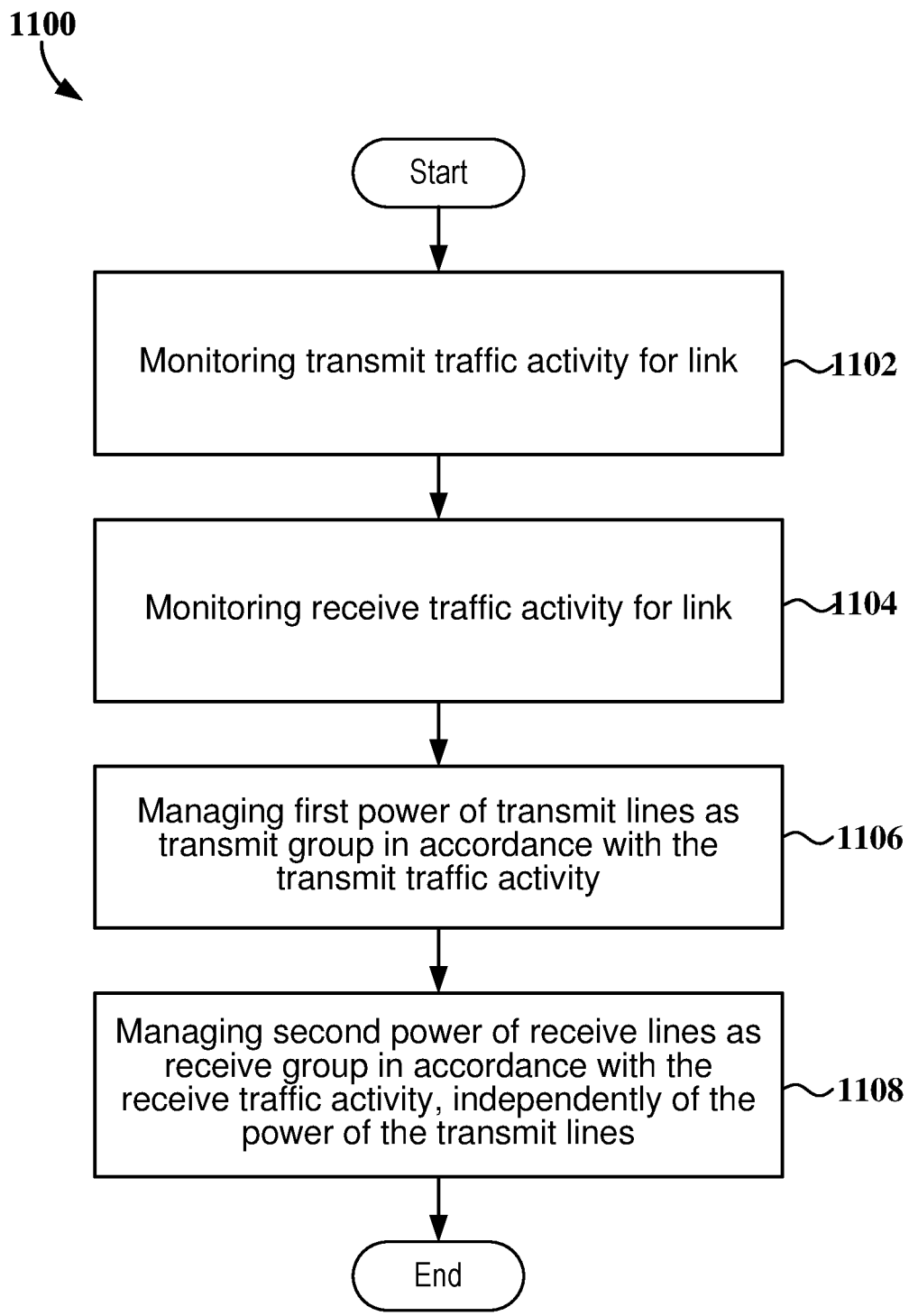
FIG. 11 is a flow diagram of an exemplary method for bandwidth-based power management according to aspects of the present disclosure.

FIG. 11 illustrates a flow diagram of a method 1100 for traffic-based power management for a link, e.g. a PCIe link, according to aspects of the present disclosure. In certain aspects, method 1100 effects scaling of the number of active lines, e.g. reducing the number of powered transmit lines and powered receive lines (e.g., selective powering of drivers 320 or 345 on or off).

The method 1100 includes monitoring transmit traffic activity for a link at block 1102. As described the link is a PCIe link, however, the method may be adapted to suit other links with transmit lines and receive lines. The method 1100 includes a process at block 1104 of monitoring receive traffic activity for the link. The method 1100 includes a process at block 1106 of managing a first power of transmit lines of the link as a transmit group in accordance with the transmit traffic activity. The method 1100 includes a process at block 1108 of managing a second power of the receive lines of the link as a receive group in accordance with the receive traffic activity, independently of the power of the transmit lines.

The following provides an overview of examples of the present disclosure.

Example 1: An apparatus comprising: an interface circuit configured to provide an interface with a peripheral component interconnect express (PCIe) link; and a controller configured to: monitor transmit traffic activity for the link; monitor receive traffic activity for the link; manage a first power of transmit lines of the link as a transmit group in accordance with the transmit traffic activity; and manage a second power of receive lines of the link as a receive group in accordance with the receive traffic activity, independently of the power of the transmit lines.

Example 2: The apparatus of example 1, wherein the controller is configured to set a transmit group link control register in accordance with the transmit traffic activity to store a number of active transmit lines and set a receive group link control register in accordance with the receive traffic activity to store a number of active receive lines.

Example 3: The apparatus of example 1 or 2, wherein the controller is configured to set a transmit group capabilities register in accordance with the transmit traffic activity to store capabilities of the transmit lines and set a receive group capabilities register in accordance with the receive traffic activity to store capabilities of the receive lines.

Example 4: The apparatus of any one or more of the above examples, wherein the controller is configured to manage the first power comprises placing a selected at least one transmit line of the transmit group into a standby state.

Example 5: The apparatus of example 4, wherein the controller is configured to: compare the transmit traffic activity of the link to a threshold; and place the transmit lines into a standby substate in response to the transmit traffic activity being less than the threshold, wherein the standby substate is a lower power state than the standby state.

Example 6: The apparatus of any one or more of the above examples, wherein the controller is configured to manage the second power by placing a selected at least one receive line of the receive group into a standby state.

Example 7: The apparatus of example 6, wherein the controller is further configured to: compare the receive traffic activity of the link to a threshold; and place the receive lines into a standby substate in response to the receive traffic activity being less than the threshold, wherein the standby substate is a lower power state than the standby state.

Example 8: The apparatus of any one or more of the above examples 1, wherein managing the first power comprises managing a number of active transmit lines for the transmit group of the link.

Example 9: The apparatus of any one or more of the above examples, wherein the controller is configured to manage the first power by: supplying one or more voltages or clocks to an interface circuit configured to provide an interface with the link; and setting levels of the one or more voltages supplied to the interface circuit based on the first power.

Example 10: A method comprising: monitoring transmit traffic activity for a peripheral component interconnect express (PCIe) link; monitoring receive traffic activity for the link; managing a first power of transmit lines of the link as a transmit group in accordance with the transmit traffic activity; and managing a second power of the receive lines of the link as a receive group in accordance with the receive traffic activity, independently of the power of the transmit lines.

Example 11: The method of example 10, further comprising setting a transmit group link control register in accordance with the transmit traffic activity and setting a receive group link control register in accordance with the receive traffic activity.

Example 12: The method of example 10 or 11, further comprising setting a transmit group link status register in accordance with the transmit traffic activity and setting a receive group link status register in accordance with the receive traffic activity.

Example 13: The method of any one or more of examples 10 to 12, wherein managing the first power comprises placing a selected at least one transmit line of the transmit group into a standby state.

Example 14: The method of example 13, further comprising: comparing the transmit traffic activity of the link to a threshold; and placing the transmit lines into a standby substate in response to the transmit traffic activity being less than the threshold, wherein the standby substate is a lower power state than the standby state.

Example 15: The method of any one or more of the above examples, wherein managing the second power comprises placing a selected at least one receive line of the receive group into a standby state.

Example 16: The method of example 15, further comprising: comparing the receive traffic activity of the link to a threshold; and placing the receive lines into a standby substate in response to the receive traffic activity being less than the threshold, wherein the standby substate is a lower power state than the standby state.

Example 17: The method of any one or more of the above examples, wherein managing the second power comprises managing a number of active receive lines for the receive group of the link.

Example 18: The method of any one or more of the above examples wherein managing the second power comprises: supplying one or more voltages or clocks to an interface circuit configured to provide an interface with the link; and setting levels of the one or more voltages supplied to the interface circuit based on the second power.

Example 19: A non-transitory computer-readable medium having instructions stored therein for causing a processor of an interconnect link to perform operations comprising: monitoring transmit traffic activity for a peripheral component interconnect express (PCIe) link; monitoring receive traffic activity for the link; managing a first power of transmit lines of the link as a transmit group in accordance with the transmit traffic activity; and managing a second power of the receive lines of the link as a receive group in accordance with the receive traffic activity, independently of the power of the transmit lines.

Example 20: The computer-readable medium of example 19, further comprising: comparing the transmit traffic activity of the link to a threshold; and placing a selected at least one transmit line of the transmit group into a standby state in response to the transmit traffic activity being less than the threshold, wherein the standby state is a lower power state.

It is to be appreciated that the present disclosure is not limited to the exemplary terms used above to describe aspects of the present disclosure. For example, bandwidth may also be referred to as throughput, data rate or another term.

Although aspects of the present disclosure are discussed above using the example of the PCIe standard, it is to be appreciated that present disclosure is not limited to this example, and may be used with other standards.

The host clients 214, the host controller 212, the device controller 252 and the device clients 254 discussed above may each be implemented with a controller or processor configured to perform the functions described herein by executing software including code for performing the functions. The software may be stored on a non-transitory computer-readable storage medium, e.g. a RAM, a ROM, an EEPROM, an optical disk, and/or a magnetic disk, shows as host system memory 240, endpoint system memory 274, or as another memory.

Any reference to an element herein using a designation e.g. "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   an interface circuit configured to provide an interface with a peripheral component interconnect express (PCIe) link; and
   a controller configured to:
      monitor transmit traffic activity for the link;
      monitor receive traffic activity for the link;
      manage a first power of transmit lines of the link as a transmit group in accordance with the transmit traffic activity by converting the transmit traffic activity to a number of active differential line pairs of the transmit group using multiple thresholds and transitioning the link through an active state to a standby substate corresponding to the number of active differential line pairs of the transmit lines of the transmit group; and
      manage a second power of receive lines of the link as a receive group in accordance with the receive traffic activity, independently of the power of the transmit lines by converting the receive traffic activity to a number of active differential line pairs of the receive group using multiple thresholds and transitioning the link through an active state to a standby substate corresponding to the number of active differential line pairs of the receive lines of the receive group.

2. The apparatus of claim 1, wherein the controller is configured to set a transmit group link control register in accordance with the transmit traffic activity to store a number of active transmit lines and set a receive group link control register in accordance with the receive traffic activity to store a number of active receive lines.

3. The apparatus of claim 1, wherein the controller is configured to set a transmit group capabilities register in accordance with the transmit traffic activity to store capabilities of the transmit lines and set a receive group capabilities register in accordance with the receive traffic activity to store capabilities of the receive lines.

4. The apparatus of claim 1, wherein the standby state has at least one transmit line of the transmit group as an inactive line.

5. The apparatus of claim 4, wherein the controller is configured to:
   compare the transmit traffic activity of the link to a threshold; and
   place the transmit lines into a standby substate in response to the transmit traffic activity being less than the threshold, wherein the standby substate is a lower power state than the active state.

6. The apparatus of claim 1, wherein the controller is configured to manage the second power by placing a selected at least one receive line of the receive group into a standby state.

7. The apparatus of claim 6, wherein the controller is further configured to:
   compare the receive traffic activity of the link to a threshold; and
   place the receive lines into a standby substate in response to the receive traffic activity being less than the threshold, wherein the standby substate is a lower power state than the active state.

8. The apparatus of claim 1, wherein managing the first power comprises managing a number of active transmit lines for the transmit group of the link.

9. The apparatus of claim 1, wherein the controller is configured to manage the first power by:
   supplying one or more voltages or clocks to an interface circuit configured to provide an interface with the link; and
   setting levels of the one or more voltages supplied to the interface circuit based on the first power.

10. A method comprising:
   monitoring transmit traffic activity for a peripheral component interconnect express (PCIe) link;
   monitoring receive traffic activity for the link;
   managing a first power of transmit lines of the link as a transmit group in accordance with the transmit traffic activity by converting the transmit traffic activity to a number of active differential line pairs of the transmit group using multiple thresholds and transitioning the link through an active state to a standby substate corresponding to the number of active differential line pairs of the transmit lines of the transmit group; and
   managing a second power of the receive lines of the link as a receive group in accordance with the receive traffic activity, independently of the power of the transmit lines by converting the receive traffic activity to a number of active differential line pairs of the receive group using multiple thresholds and transitioning the link through an active state to a standby substate corresponding to the number of active differential line pairs of the receive lines of the receive group.

11. The method of claim 10, further comprising setting a transmit group link control register in accordance with the transmit traffic activity and setting a receive group link control register in accordance with the receive traffic activity.

12. The method of claim 10, further comprising setting a transmit group link status register in accordance with the transmit traffic activity and setting a receive group link status register in accordance with the receive traffic activity.

13. The method of claim 10, wherein the standby state has at least one transmit line of the transmit group as an inactive line.

14. The method of claim 13, further comprising:
comparing the transmit traffic activity of the link to a threshold; and
placing the transmit lines into a standby substate in response to the transmit traffic activity being less than the threshold, wherein the standby substate is a lower power state than the active state.

15. The method of claim 10, wherein the standby state has at least one receive line of the receive group as an inactive line.

16. The method of claim 15, further comprising:
comparing the receive traffic activity of the link to a threshold; and
placing the receive lines into a standby substate in response to the receive traffic activity being less than the threshold, wherein the standby substate is a lower power state than the active state.

17. The method of claim 10, wherein managing the second power comprises managing a number of active receive lines for the receive group of the link.

18. The method of claim 10, wherein managing the second power comprises:
supplying one or more voltages or clocks to an interface circuit configured to provide an interface with the link; and
setting levels of the one or more voltages supplied to the interface circuit based on the second power.

19. A non-transitory computer-readable medium having instructions stored therein for causing a processor of an interconnect link to perform operations comprising:
monitoring transmit traffic activity for a peripheral component interconnect express (PCIe) link;
monitoring receive traffic activity for the link;
managing a first power of transmit lines of the link as a transmit group in accordance with the transmit traffic activity by converting the transmit traffic activity to a number of active differential line pairs of the transmit group using multiple thresholds and transitioning the link through an active state to a standby substate corresponding to the number of active differential line pairs of the transmit lines of the transmit group; and
managing a second power of the receive lines of the link as a receive group in accordance with the receive traffic activity, independently of the power of the transmit lines by converting the receive traffic activity to a number of active differential line pairs of the receive group using multiple thresholds and transitioning the link through an active state to a standby substate corresponding to the number of active differential line pairs of the receive lines of the receive group.

20. The non-transitory computer-readable medium of claim 19, further comprising instructions for causing the processor of the interconnect link to perform operations comprising:
comparing the transmit traffic activity of the link to a threshold; and
placing a selected at least one transmit line of the transmit group into a standby state in response to the transmit traffic activity being less than the threshold, wherein the standby state is a lower power state.

* * * * *